C. J. COLEMAN.
SECONDARY BATTERY.
APPLICATION FILED OCT. 7, 1903.

1,008,525.

Patented Nov. 14, 1911.

2 SHEETS—SHEET 1.

Witnesses:
Livingston Emery
Henry Barnes

Inventor:
Clyde J. Coleman
By Henry D. Williams
Atty.

C. J. COLEMAN.
SECONDARY BATTERY.
APPLICATION FILED OCT. 7, 1903.

1,008,525.

Patented Nov. 14, 1911
2 SHEETS—SHEET 2.

Witnesses:
Livingston Emery
Henry Barnes

Inventor:
Clyde J. Coleman
By Henry D. Williams
Atty.

UNITED STATES PATENT OFFICE.

CLYDE J. COLEMAN, OF ROCKAWAY, NEW JERSEY.

SECONDARY BATTERY.

1,008,525.  Specification of Letters Patent.  Patented Nov. 14, 1911.

Application filed October 7, 1903. Serial No. 176,166.

*To all whom it may concern:*

Be it known that I, CLYDE J. COLEMAN, a citizen of the United States, residing at Rockaway, in the county of Morris and State of New Jersey, have invented certain new and useful Improvements in Secondary Batteries, of which the following is a specification, reference being had therein to the accompanying drawing, forming a part thereof.

My invention relates to secondary or storage batteries and has for its objects simplicity of construction, durability and effectiveness of operation.

According to my invention the walls or partitions of individual cells are formed by plates carrying active material, and according to my invention, insulating sealing means are provided inclosing the space between the plates to form a cell. According to my invention this insulating sealing means comprises a packing frame in contact with the plates about the margins thereof, and such a packing frame provided with yielding contact faces, and also such a packing frame combined with a sealing filling at the ends thereof.

My invention also includes the provision of insulating and protecting coverings at and in proximity to the tops and bottoms of the plates, and insulating separations at portions of the plates which are unprovided with active material, and clamping means provided by the container and various improvements in the construction and combination of parts.

I will now described the accompanying drawings illustrating a battery embodying my invention and will thereafter point out my invention in claims.

Figure 1:
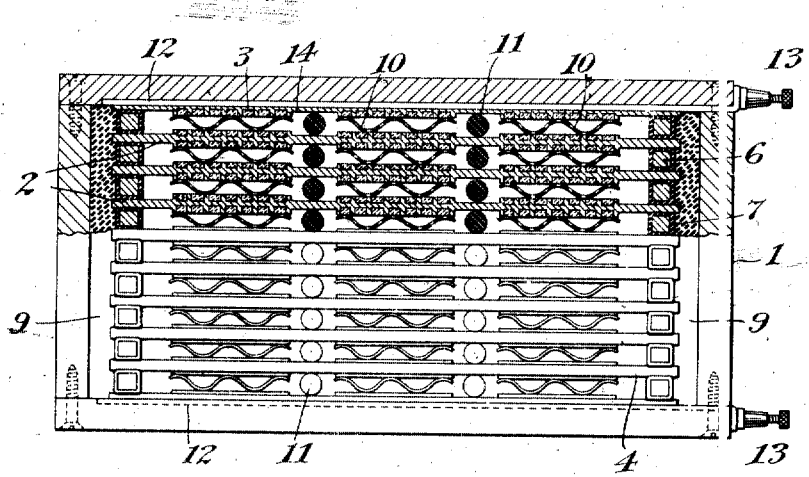
Figure 2:
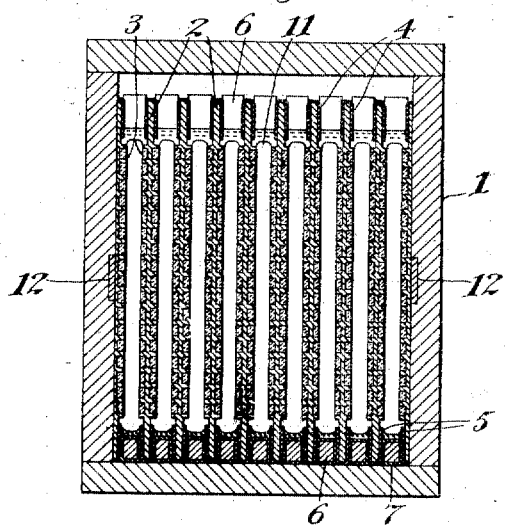
Figure 3:
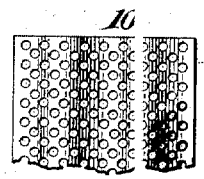
Figure 4:
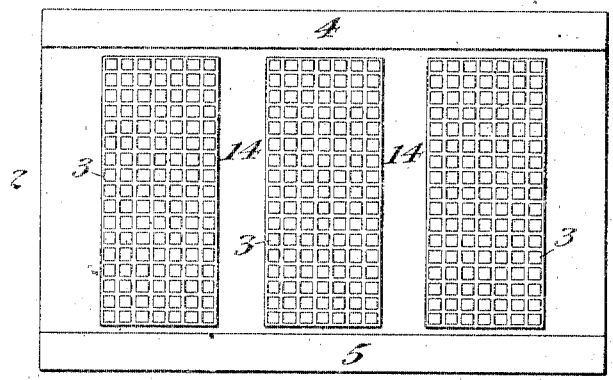
Figure 5:
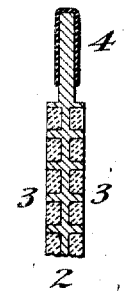
Figure 6:
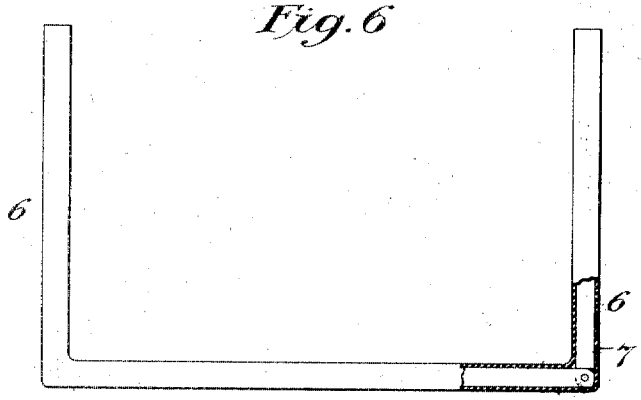
Figure 7:
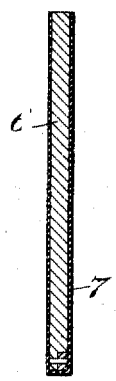
Figure 8:
Figure 9:
Figure 10:
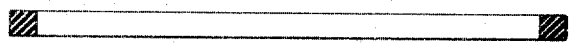

Figure 1 is a sectional plan view of a battery embodying my invention. Fig. 2 is a transverse vertical section of the same. Fig. 3 is a face view of a portion of the perforated insulated spacing means. Fig. 4 is a face view of one of the plates. Fig. 5 is an enlarged transverse section of the upper part of a plate. Figs. 6, 7 and 8 are, respectively, a face view, a vertical section and a plan view of the spacing and sealing means. Figs. 9 and 10 are horizontal sections of modified forms of spacing and sealing means.

The casing 1 is shown as of rectangular form, and is conveniently made of wood and the sides are secured in place by fastening means, as screws, adapted to exert considerable pressure to force tightly together the interior portions of the battery.

The plates 2 carrying the active material are provided with a plurality of active material carrying portions 3, and intervening portions 14 unprovided with active material, each of the active material carrying portions being honeycombed or provided with a plurality of pockets or receptacles for the active material. The outer plates have smooth surfaces on their outer faces, which abut against the sides of the container and have the honeycombed portions 3 only on their inner faces. The other plates have the honeycombed portions 3 on both faces. These honeycombed portions also terminate below the tops of the plates and above the bottoms of the plates, and the tops and bottoms of the plates are provided with insulating and protecting coverings 4 and 5, respectively, which may be of soft rubber cemented on with asphaltum or other suitable cement. The upper protecting covering 4 extends down from the top of a plate on both sides thereof to a line below the surfaces of the electrolyte, thereby protecting the plate from exposure to air at the liquid line and from the deterioration which usually occurs on the liquid line. The lower insulating covering 5 extends upward from the bottom of the plate on both sides thereof a sufficient distance to prevent short circuiting between the plates by dislodged portions of active material which may fall to the bottom of a cell.

The spacing and sealing means comprise packing frames 6 having a marginal contact with the battery plates and as shown each having a horizontal lower part or bar and two end uprights extending therefrom. These packing frames may be of hardwood boiled in beeswax or of hard rubber and, in the construction shown in Figs. 6, 7 and 8, covered with a soft rubber tube 7, being jointed at the corners to facilitate drawing on the rubber tube. In the construction shown in Fig. 9 the packing frames are covered on their contact faces only with soft rubber facings 8 and in the construction shown in Fig. 10 are unprovided with yielding facings and may be of hard rubber and may be used with a proper cementing material on their contact faces. These packing frames make a tight marginal contact with the battery plates when compressed by the tightening of the sides of the container and effectually seal the electrolyte in the several cells formed between the battery plates. As an additional sealing means and to firmly hold the plates in place I fill the space between the ends of the plates and end walls of the container and between the outer faces of the packing frames and end walls of the container, with a suitable asphaltum or cement filling 9. Between the active material carrying portions of the plates, perforated and corrugated contact guards 10 are provided which may be of rubber or other suitable insulating material. Between the plates, at the portions of the plates unprovided with receptacles for active materials, separators are provided, these separators being shown as vertical rods 11, which may be of hard rubber and which ordinarily are not in tight contact with the plates, but which effectually resist any substantial warping or distortion of the plates and, exerting this resistance at noncellular portions of the plate, do not thereby injure the cells or dislodge the active material.

In the battery shown the several cells are connected in series, current collecting contact strips 12 being seated in grooves in the sides of the container in contact with the outer plates and being connected to binding posts 13, forming the battery terminals. One outer plate is electro-positive and the other end plate is electro-negative, and the other plates are electro-positive on one side and electro-negative on the other side and the plates are insulated from each other.

The electrolyte is preferably gelatinized by the addition of a small percentage of silicate of soda so as to prevent any spilling during transit or in portable work and my improved battery is particularly well adapted for use in motor vehicles, cars, etc.

It is obvious that various modifications may be made in the construction shown and above particularly described within the spirit and scope of my invention.

What I claim and desire to secure by Letters Patent is:

1. A secondary battery cell comprising a pair of plates carrying active material, an insulating packing frame in contact with such plates about the margins thereof, such packing frame having a separate yielding covering, a container, a sealing filling between the ends of the plates and packing frame and the ends of the container, and clamping means for pressing the plates and packing frame together.

2. A secondary battery cell, comprising a pair of plates carrying active material, a container, a relatively thin insulating covering enveloping the lower portion of each plate, said plates being arranged to provide a space between the insulating covers of adjacent plates to receive dislodged active material whereby to prevent short circuiting of the plates by such dislodgment of active material.

3. A secondary battery cell comprising a pair of plates having active material carrying portions terminating below the tops of the plates and above the bottoms of the plates and active material in such portions, the plates at the bottom thereof being arranged to provide a space to receive dislodged active material, a container, an electrolyte, the upper portions unprovided with active material of the plates extending from points below the upper level of the electrolyte to points above such upper level, a protecting covering for the upper portion unprovided with active material of each plate and extending above and below the upper level of the electrolyte, and an insulating covering enveloping the lower portion unprovided with active material of each plate.

4. A secondary battery cell comprising a pair of plates having active material carrying portions terminating below the tops of the plates and above the bottoms of the plates and active material in such portions, the plates at the bottom thereof being arranged to provide a space to receive dislodged active material, a container, an electrolyte; the upper portions unprovided with active material of the plates extending above the upper level of the electrolyte from points below the upper level of the electrolyte, a protecting covering for such upper portion of each plate, and an insulating covering enveloping the lower portion unprovided with active material of each plate and adapted to prevent short-circuiting by the dislodged active material.

5. A secondary battery comprising a plurality of vertically arranged plates having a plurality of active material carrying portions and active material in such portions and intervening portions unprovided with active material and one or more insulating separators between the plates at the portions unprovided with active material, and insulating sealing means in contact with the plates about the margins thereof to complete the walls of such cells.

6. A secondary battery cell comprising a container, an electrolyte, a pair of plates having a plurality of active-material carrying portions and active material in such portions and depressed portions unprovided with active material, insulating separators between the plates at the portions containing the active material and in contact therewith, supplementary insulated separators at the depressed portions and in contact therewith, and protecting coverings enveloping the upper and lower portions of each plate.

In testimony whereof I have affixed my signature in presence of two witnesses.

CLYDE J. COLEMAN.

Witnesses:
HENRY BARNES,
HENRY D. WILLIAMS.